(12) United States Patent
Rizzo et al.

(10) Patent No.: US 10,357,043 B2
(45) Date of Patent: Jul. 23, 2019

(54) DRY AGING PORTABLE DEVICE

(71) Applicants: Frank Davidson Rizzo, Boone, NC (US); Scott Kobryn, Niagara on the Lake (CA)

(72) Inventors: Frank Davidson Rizzo, Boone, NC (US); Scott Kobryn, Niagara on the Lake (CA)

(*) Notice: Subject to any disclaimer, the term of this patent is extended or adjusted under 35 U.S.C. 154(b) by 162 days.

(21) Appl. No.: 15/283,301

(22) Filed: Oct. 1, 2016

(65) Prior Publication Data
US 2017/0094983 A1 Apr. 6, 2017

Related U.S. Application Data

(60) Provisional application No. 62/236,873, filed on Oct. 3, 2015.

(51) Int. Cl.
| | |
|---|---|
| *A47F 3/04* | (2006.01) |
| *A23L 3/28* | (2006.01) |
| *A23B 4/037* | (2006.01) |
| *A23B 4/03* | (2006.01) |
| *A23B 4/015* | (2006.01) |
| *A23L 3/40* | (2006.01) |

(52) U.S. Cl.
CPC ............ *A23B 4/037* (2013.01); *A23B 4/015* (2013.01); *A23B 4/031* (2013.01); *A23L 3/28* (2013.01); *A47F 3/0408* (2013.01); *A47F 3/0495* (2013.01); *A23L 3/40* (2013.01)

(58) Field of Classification Search
CPC .... A47F 3/0495; A47F 3/0413; A47F 3/0408; A23L 3/28; A23L 3/3409; A23L 3/40; A21B 3/04; A21B 4/015

USPC ......... 99/467, 468, 469, 474, 476, 484, 451, 99/357; 426/248, 263, 465, 474
See application file for complete search history.

(56) References Cited

U.S. PATENT DOCUMENTS

| | | | | |
|---|---|---|---|---|
| 2,560,057 A | * | 7/1951 | Williams | A23B 4/066 62/271 |
| 3,552,297 A | | 1/1971 | Williams | |
| 3,857,254 A | * | 12/1974 | Lobel | A22C 9/00 426/524 |
| 5,930,454 A | * | 7/1999 | Cho | A23L 3/365 165/61 |
| 8,998,177 B2 | * | 4/2015 | Wang | A23B 7/148 261/78.2 |
| 9,273,897 B2 | | 3/2016 | Lee et al. | |
| 9,314,037 B1 | | 4/2016 | Gobster | |

(Continued)

FOREIGN PATENT DOCUMENTS

JP 2007-006820 1/2007

*Primary Examiner* — Reginald Alexander (57) ABSTRACT

A method and system for dry aging the meat product uses a 12 volt DC powered portable unit comprising a plastic box configured for housing the primal cut of meat and placed inside a refrigeration system. The box is further equipped with an internal and external blower to control the air circulation and humidity respectively inside the box. A germicidal UV light disposed within the plenum in front of the internal blower to provide germicidal action on the dry aging meat product. A PCB controller placed on top of the box embedded with software and a humidistat to control the humidity inside the box and maintaining a closed micro environment to dry age the meat product with desired texture, flavor and tenderness.

11 Claims, 6 Drawing Sheets

(56) References Cited

U.S. PATENT DOCUMENTS

| | | | |
|---|---|---|---|
| 2010/0154452 A1* | 6/2010 | McCann | A23B 4/066 62/247 |
| 2011/0219805 A1* | 9/2011 | Youn | F25D 11/02 62/331 |
| 2014/0037829 A1 | 2/2014 | Lobel | |
| 2016/0106133 A1 | 4/2016 | Schmitz | |

* cited by examiner

DRY AGING PORTABLE DEVICE

RELATED APPLICATION DATA

This application claims the priority to U.S. Provisional Application No. 62/236,873 filed on Oct. 3, 2015, which is hereby incorporated by reference in its entirety.

TECHNICAL FIELD

The invention relates to portable meat aging devices and process for dry aging, tenderizing and disinfecting the meat in a temperature and humidity controlled environment.

BACKGROUND

In general, meat products like beef are subjected to an aging process before consumption, in order to reduce entrained moisture and concentrate the natural flavors while tenderizing the meat texture. This aging process can be done in different ways and the predominantly used techniques are dry and wet aging processes.

Conventionally, wet aging is a less time consuming process that uses vacuum-sealed bag to control or regulate the moisture loss as well as limit exposure to oxygen for the meat product to age which accounts for the tenderness and flavor of the meat product. However the wet aging process lacks the desired depth of flavor. On the other hand, dry aging is time consuming process wherein the primal cuts of meat are maintained in a desired cooling temperature for a long period of time in combination with air movement or convection. As the time goes, the dry aged meat product loses water weight in the form of evaporation thereby dehydrating the product itself and concentrating the product to change its texture and flavor. The connective tissue of the meat product in this process undergoes chemical decomposition to improve the tenderization of the meat texture. The process is quite expensive as it may need a temperature-controlled cooler set aside for only dry aging. Dry aging can be done in different ways such as dedicated refrigerator or electric coolers, dry bags and so on.

The electric coolers used for commercially dry aging are generally large and very expensive and not designed for home use. The other method used to dry the meat products at home may require a refrigerator, cooler fan and a rack for holding the meat. This takes so much of time as the fan may not provide proper convection and position of the meat product inside the rack may not help in proper dehydration of the product thereby resulting in reduced aged flavor and tenderization. The meat product is also left exposed to all the other items contained in the refrigerator, which presents a higher chance for contamination.

Most of the current techniques depend on a dedicated refrigeration system with necessary components to support the dry aging process. However the space needed for the system is more and also it is very expensive and they are designed to hold large quantities of beef for dry aging, which the average consumer does not need. All the dedicated refrigerators are designed for commercial applications. Also there is no portable and convenient device for carrying out the dry aging process in a microenvironment.

Products and processes for drying normal food products like as disclosed in US20150342204 also has proven out to be ineffective because of the unique nature of steak's level of moisture. Most of the processes in the prior art rely upon electromagnetic radiation or natural substances like salt (as disclosed in U.S. Pat. No. 7,998,517). While excessive exposure to acute radiation can potentially make the steak dangerous for consumption, usage of rock salt can cause steak to change its natural taste and thus desired outcome is not achieved.

In light of the aforementioned drawbacks and limitations, there exists a need for a portable device which will create a microenvironment that can go inside a regular, undedicated refrigerator which can dry age the meat products to the desired texture, flavor and tenderness of the product and allow for longer aging periods while maximizing flavor.

SUMMARY

The objective of the present invention is to provide a portable meat-aging device for use within a refrigerator system that is typically a cold and low humidity environment as a result of the refrigeration process.

The system and method are disclosed for dry aging the meat using a portable box that creates a microenvironment to achieve the desired texture, flavor and tenderness of the meat product.

According one embodiment of the present invention, the system comprises a 12 volt DC powered, portable plastic dry aging box made of High Density Polyethene material to receive the meat product, a right angled internal circulation blower or multiple blowers to properly circulate air and dry age the meat product positioned within the portable plastic box, and an external humidity control blower positioned within the main body of the portable plastic box to expel moisture laden air and control the humidity inside the box, an ultraviolet germicidal lamp is placed near the internal blower for maximum germicidal effectiveness. A humidistat is installed to measure the humidity inside the box and a PCB control board with a display and software is deployed control the drying process inside the box.

According to another embodiment of the present invention, the method of dry aging a primal cut of a meat product over a period of time comprises the steps of: placing the meat product inside the portable plastic box which is kept inside the refrigerator; a right angled internal circulation blower inside the portable plastic box which circulates the air towards the meat product kept inside the of the box; an external humidity control blower to control the humidity inside the box with the help of software embedded in the PCB control board and the software activates the external blower based on the humidity values sensed by the humidistat.

In a further embodiment, the method comprises: protecting the environment inside the box using a UVC germicidal light placed in front of the internal circulation blower so that all air forced back into the box towards the meat product is cleansed for germicidal action. Further, a display function placed on top of the box externally to show the temperature and humidity values which is also controlled by the PCB controller.

The method and apparatus can also be used for dry aging other edible meat products with similar inherent characteristics as that of a steak.

DETAILED DESCRIPTION OF DIFFERENT EMBODIMENTS

All through the specification, the technical terms and abbreviations are to be interpreted in the broadest sense of the respective terms, and include all similar items in the field known by other terms, as may be clear to persons skilled in art. Restriction or limitation if any referred to in the specification, is solely by way of example and for understanding the present invention. Also, there is no stringent rule as far as the visual layout of the apparatus is concerned. While the drawings display the preferred embodiment, the invention would cover all other variants that seek to achieve the same object as that of the present invention.

In different exemplary embodiments, the technology described herein discloses a portable device and methods for meat storage, tenderizing, and aging in a temperature and humidity controlled environment.

Dry aging of primal cuts of meat products is generally done using specialized racks under a climate-controlled environment to evaporate the moisture from the muscles of the meat concentrating flavor and tenderizing the meat product. A piece of meat product like beef loses up to 15% of its volume by itself while drying and therefore while dry aging the primal cut of beef under managed air circulation, strict temperature and humidity controls, the beef approximately loses 25% of the original weight through its moisture. This accounts for the quality of the final dry aged meat product. The portable plastic box according to the present invention is placed in the cold, dry ambience of a refrigerator to create a microenvironment wherein the low humidity of a refrigerator which is a by-product of the refrigeration process, enables the process of said dry aging for meat products.

Figure 1:
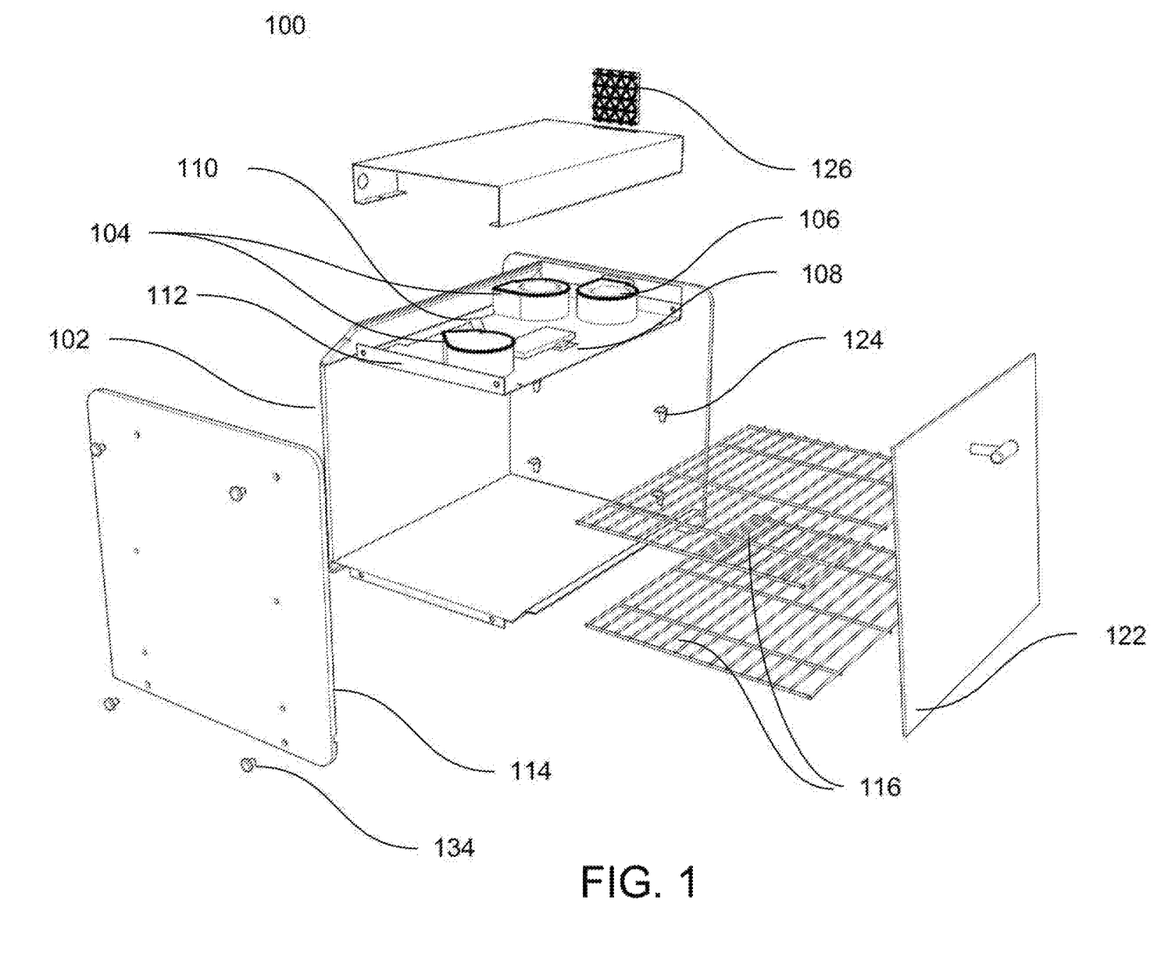
FIG. 1 illustrates an exploded view of a portable meat aging system incorporating aspects of the present invention.

FIG. 1 illustrates a preferred embodiment of the present invention and shows exploded view of a dry aging portable device which comprises a box 100 made of High-density polyethylene (HDPE). The box 100 houses the primal cuts of the meat product by receiving it using the drying racks 116. The box 100 is compact such that it can fit easily inside a regular undedicated refrigerator, which may be having other items. The box 100 also has a configuration defining an inner shell with a plenum and blower deck 112 along with outer main body 102 and end plates 114 and this creates a closed environment where the meat can be dry aged inside a normal refrigerator. The box 100 houses all the major components of the dry aging system so that the contamination with the other items is prevented. The box 100 is made primarily from a relatively flexible material such as a plastic material, a thin metal material, a thin stainless steel material, or a similar durable device.

Figure 6:
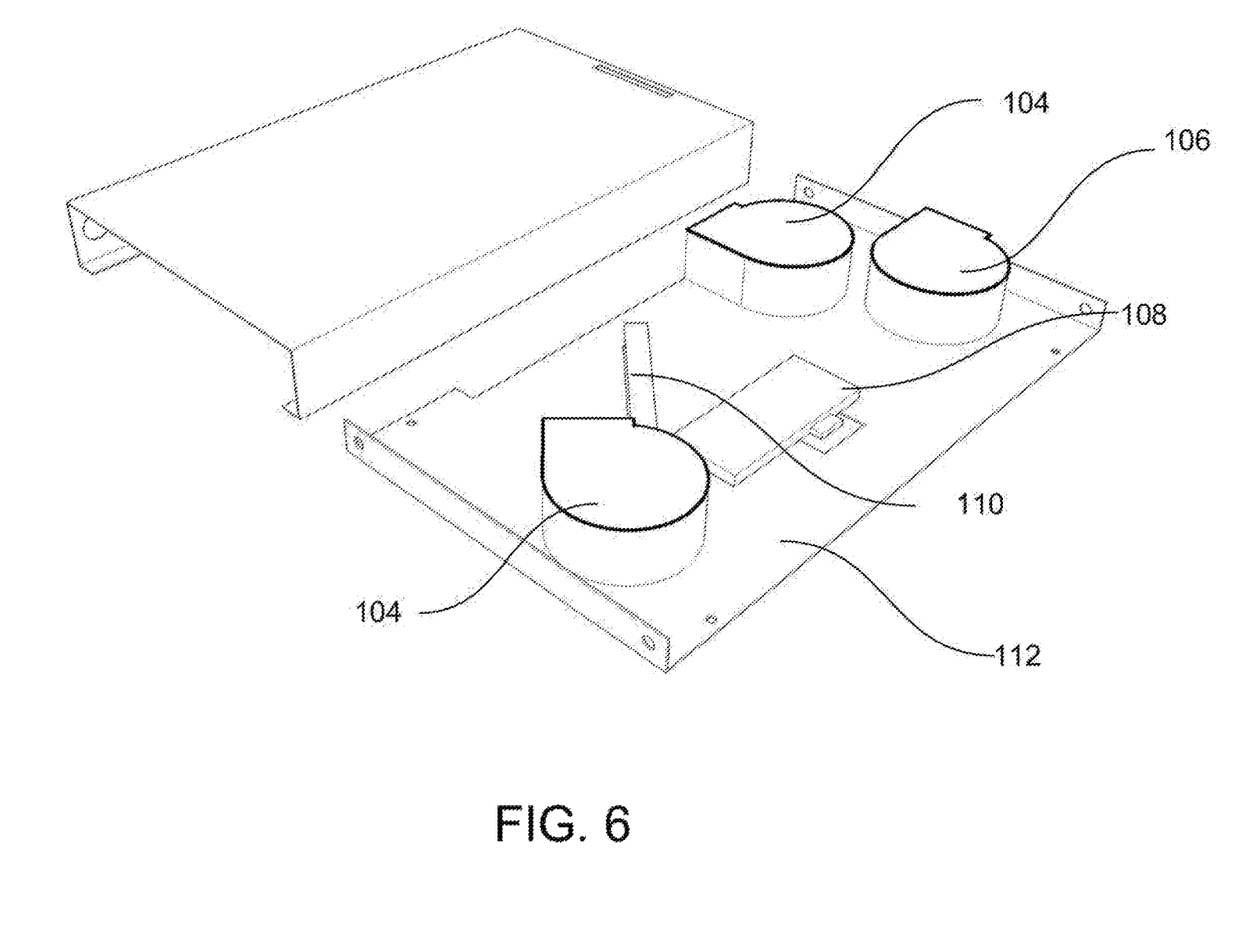
FIG. 6 illustrates detailed view of the Control deck of a portable meat aging system showing different components responsible for proper dry aging.

As per the preferred embodiment, according to the present invention. FIG. 6 shows the components of the blower deck responsible for maintaining the required environment inside the box. The blower deck 112 of dry aging box comprises an internal air circulation blower 104 which is placed at right angle to the side panel of the plenum and blower deck 112 and this blower circulates air constantly to maintain the desired environment for dry aging the meat product. The dry aging box further includes an external humidity control blower 106 to maintain the humidity by expelling the moisture created inside the box. The blower has a carbon filter 126 installed on its opening to prevent contamination of food placed inside the fridge. Both the internal air circulation blower 104 and external humidity control blower 106 are controlled by a PCB control module 108. Software is embedded in the PCB control module 108 to control the operation of internal air circulation blower 104, and senses the humidity inside the box using the humidistat sensor, which is placed inside the PCB control module. The sensor in turn activates the external humidity control blower 106 based on the sensor readings. All these components of FIG. 6 are shown in the exploded view in FIG. 1 of the preferred embodiment also.

Figure 4:
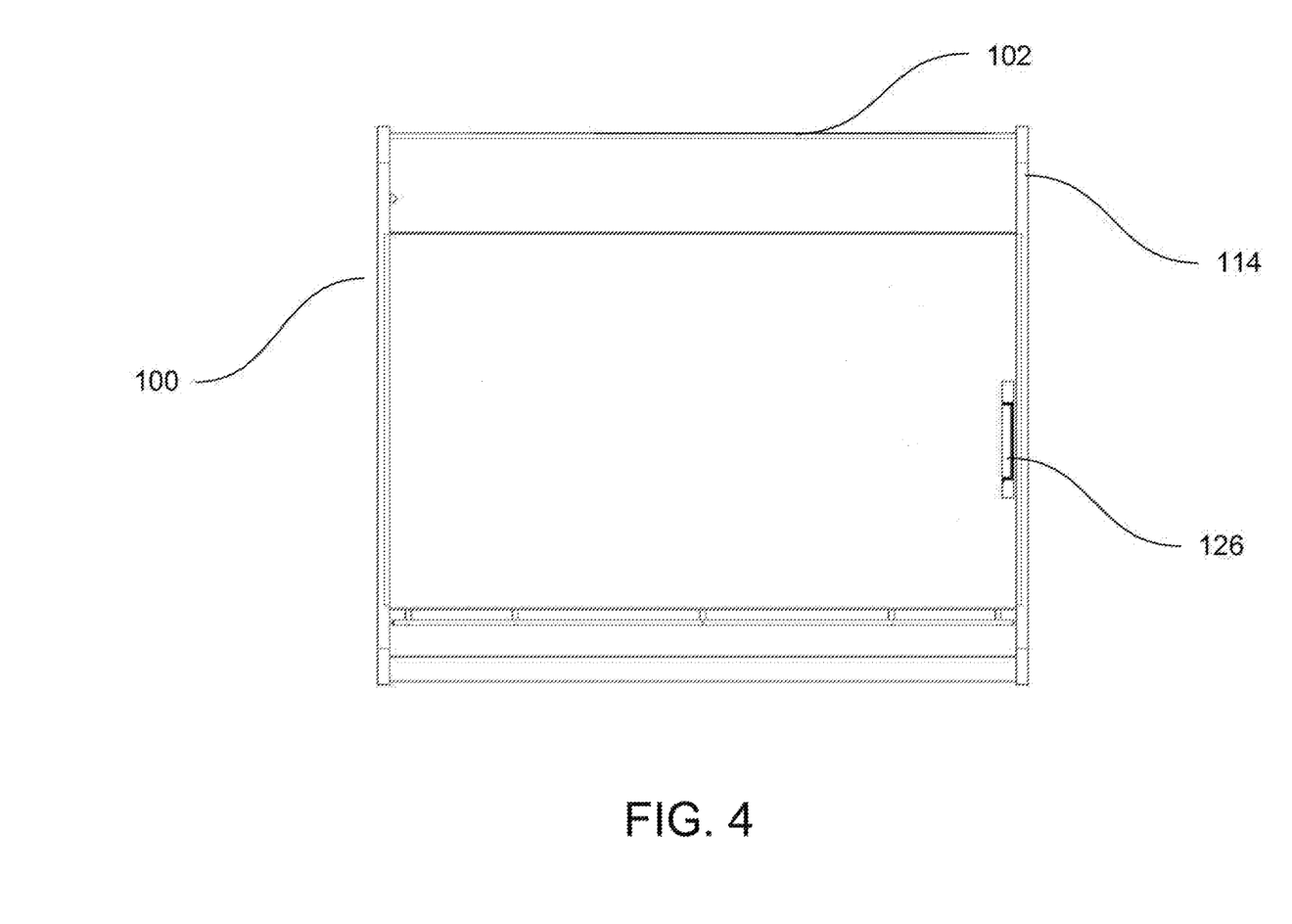
FIG. 4 illustrates a top view of an of a portable meat aging system incorporating aspects of the present invention.

In an exemplary embodiment of the present invention, the humidstat sensor can also be placed externally, on the ceiling of the box in the form of a digital display. FIG. 4 shows the top view of the meat aging device.

The dry aging box 100 as depicted in FIG. 1 and FIG. 6, further comprises a UVC Germicidal Light 110 operably positioned in front of the internal air circulation blower 104 so that air being circulated passes by the bulb and is effectively cleansed by the UV light for maximum germicidal action. The UVC germicidal light located in the portable plastic box 100 sequesters the meat product that has to be dry aged from contaminators that may potentially cause contamination during the aging process. The UV radiation coupled with unique environment inside the apparatus thus kills bacteria and enhances the freshness of meat.

In the preferred embodiment of the present invention, a wifi chip is installed inside the PCB to facilitate monitoring of the environment inside the device by collecting and transmitting the information about humidity and temperature on a mobile device like a smartphone or a tablet or a handheld computer having encryption key with the means to facilitate wireless communication with the wireless communication device. The chip acting as a wireless communication device and the software embedded in the PCB control module are configured to operate in a short range configuration mode. The communication between the chip and a mobile device can be established by bringing the mobile device to a position within the said short range. The encrypted data collected by the PCB control module is transmitted wirelessly through the wireless communication device to the mobile device on a secured or an unsecured network. The software application installed within the mobile device decrypts the received data and displays the relevant statistics pertaining to the peace of meat being dry aged inside the meat aging apparatus.

Figure 2:
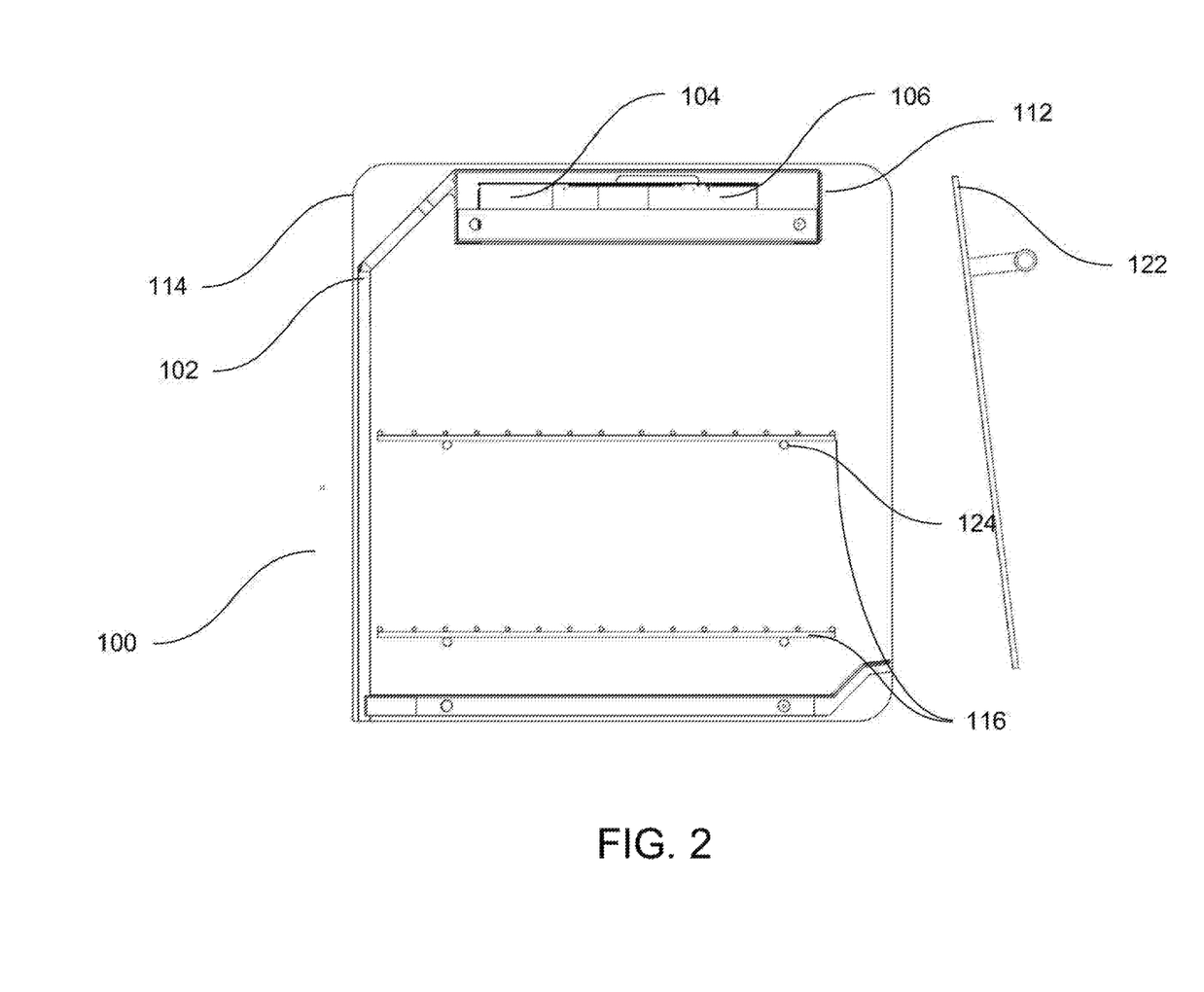
FIG. 2 illustrates a side view of a portable meat aging system incorporating aspects of the present invention.

In further embodiment, as depicted in FIG. 2, the portable plastic box 100 comprises an upper and lower drying rack 116 for holding the meat to be dry aged and it is supported by a rack holder 124. Also a separate viewing panel and closure 122 is utilized to monitor the piece of meat to be dry aged inside the box 100 and the closure for creating a closed environment respectively. The viewing panel is hingedly connected to the front panel and is made up of a transparent material like plastic attached to the front end of the closure for visually monitoring the meat.

Figure 3:
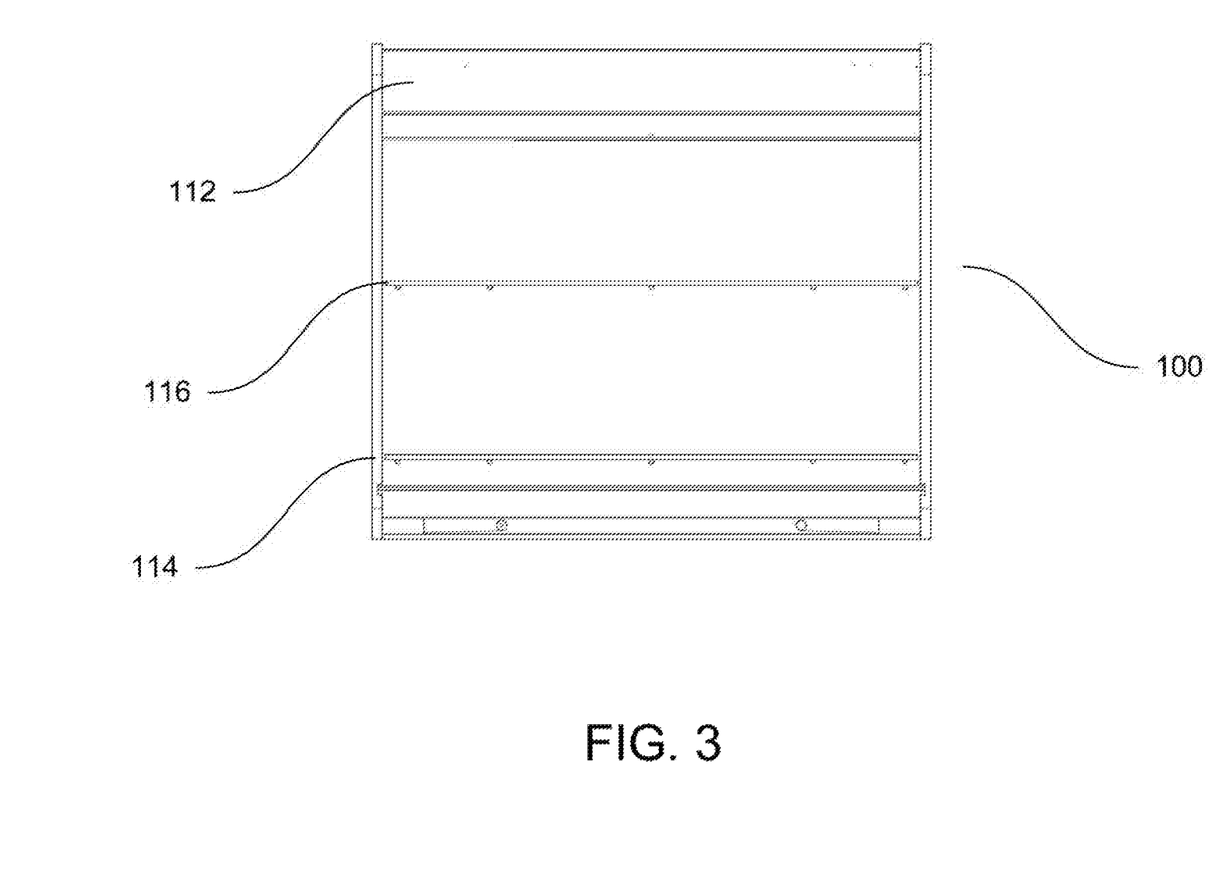
FIG. 3 illustrates a front view of an of a portable meat aging system incorporating aspects of the present invention.

In an exemplary embodiment of the present invention, the front panel comprises of transparent material with an opaque peripheral border. FIG. 3 shows the front view of the device with all major components visible from the outside.

The process of dry aging the meat product is complicated and this requires the right temperature, the correct amount of airflow, protection from external contamination and time. The interior of a regular refrigerator provides an excellent platform to accomplish the dry aging process. The refrigerator provides a consistent cooling temperature anywhere from 34-39 degrees F., which is perfect for the dry aging process except for the inherently dry humidity of the typical refrigerator. Placing the dry aging box 100 inside the refrigerator system allows for creating a perfect microenvironment to dry age the meat product, safely and easily. A 12-volt DC power is supplied to inside of the refrigerator that may suffice the functioning of the essential components as explained in the exemplary embodiments. The meat product includes aging beef; aging steak; other aging meats and other meat products.

In an exemplary embodiment of the present invention, the process for dry aging can be expedited by placing some rock salt into the microenvironment before the meat is put inside the meat aging device.

There is no strict rule regarding the positioning of all the major components of the preferred embodiment present inside the Control Deck in a particular manner. However, in an exemplary embodiment of the present invention, the meat aging device may have only one internal blower and more than one external blowers to control humidity inside the device. FIG. 6 is an exclusive view of the control deck as described in the preferred embodiment showing all the major components responsible for controlling moisture inside the box.

In order to properly dry age the meat product, the humidity of the microenvironment inside the box 100 that the meat is being aged in, must be controlled. As a piece of beef dry ages, it loses water weight in the form of evaporation. As the water wicks off of the beef it gets trapped inside the box 100, which increases the relative humidity inside the box 100. The dry aging box 100 and its components such as relative humidity sensor, a PCB control module 108 and an external exhaust fan aim to solve this problem. The box 100 features internal air circulation that helps in gradually evaporating the moisture from the meat product. As the internal circulation blower 104 blows air over the meat and wicks off moisture, the relative humidity sensor 118 measures the increase in the relative humidity because of the evaporating moisture and sends that information back to the PCB control module 108. When the relative humidity goes above a predetermined setting, the software in the PCB control module 108 utilizes the dynamic input from the humidistat sensor 118 and turns on the external humidity control blower 106 which expels out the moisture laden air inside the box 100 which lowers the negative pressure inside the box 100 and this negative pressure is balanced by the inflow of low humidity air from the refrigerator.

While there is no limit with regard to the fatness or volume of the meat product placed inside the apparatus, the time taken for dry aging varies according to the nature and level of moisture inside the meat product.

In an exemplary embodiment of the present invention, the relative humidity to be maintained in the case of steak is between 60% to 80%. Similarly different humidity levels can be maintained depending upon the level of moisture to be maintained in the peace of meat. The requisite level or range of humidity and temperature can be predefined through an electronic interface located anywhere on the surface of the device.

Figure 5:
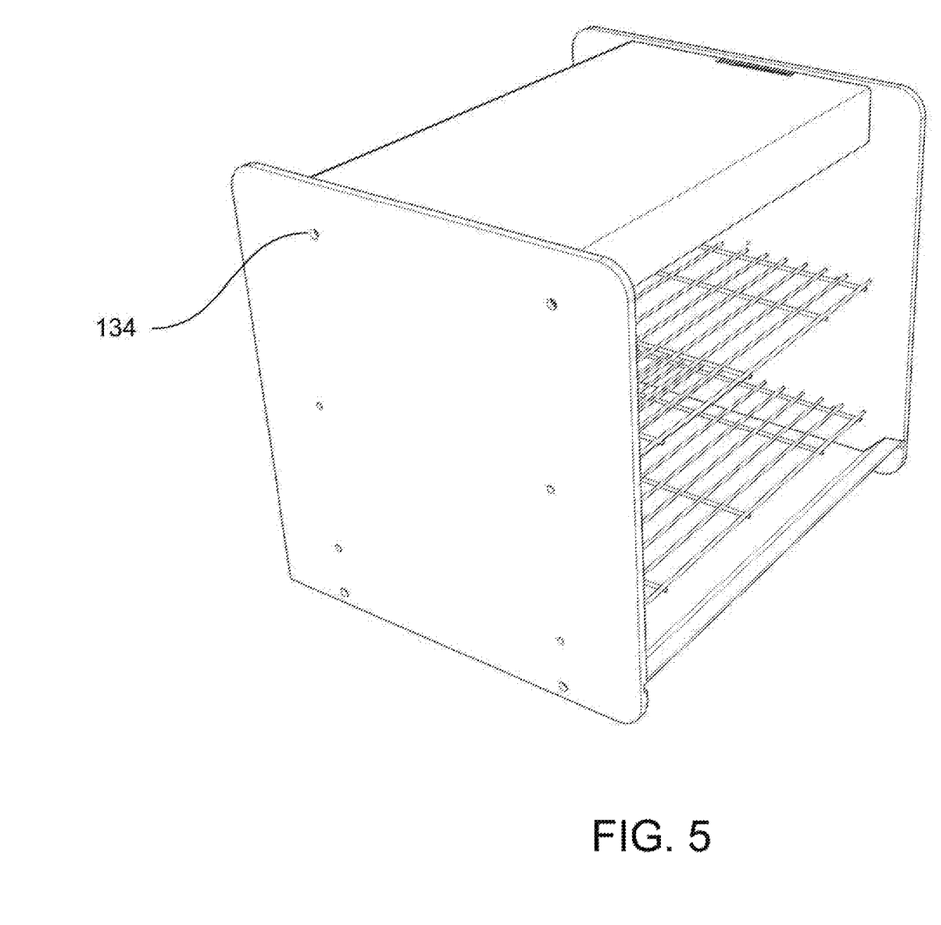
FIG. 5 illustrates isometric view of the empty portable meat aging system showing different panels attached with one another.

In an exemplary embodiment of the present invention, the device can be mechanically disassembled and is capable of being assembled quickly. The panel as shown in FIG. 5 and FIG. 1 is composed of detachable panels which are attached to each other via Assembly Snap Rivets 134 or fastners.

Thus the individual components as explained above in the different exemplary embodiments tend to perform their own function which are considered to be very critical for the dry aging process and in combination with the portable dry aging box 100 create a micro-environment inside a regular domestic refrigerator to dry age the meat product with desired texture, flavor and tenderness in a very easy, safe and convenient way.

Although the present invention has been described herein in the context of a particular implementation in a particular environment for a particular purpose, those of ordinary skill in the art will recognize that its usefulness is not limited thereto and that the present invention may be beneficially implemented in any number of environments for any number of purposes. Accordingly, the claims set forth below should be construed in view of the full breadth and spirit of the present invention as described herein.

We claim:

1. A portable meat-aging device for use in a refrigerator comprising:
    a. a box with a main body defining an inner space and end plates configured for receiving and housing the meat;
    b. at least one internal blower operably positioned within the main body of the box to circulate air within the inner space;
    c. an external blower operably positioned within the main body of the box controlling the humidity inside the box by expelling the moisture loss from the meat product wherein, the moisture laden air creates a negative pressure in the box which is balanced by the inflow of low humidity air from the refrigerator environment;
    d. an ultraviolet light positioned in front of the internal blower to cleanse the air circulated inside the inner space;
    e. A 12-volt DC powered control module and humidistat operably positioned within the main body of the dry aging box placed within a regular refrigerator wherein, software controls all the dry aging process with the operation of internal and external blower.

2. Portable meat aging device of claim 1 where the said box is made up of a relatively flexible material selected from a group consisting of HDPE, plastic and stainless steel.

3. Portable meat aging device of claim 1 further comprising at least one drying rack supported by at least one rack holder for holding the meat.

4. Portable meat aging device of claim 1 further comprising at least one display function on the surface of the box to show the temperature inside the box and the time that has passed since the meat has been stored.

5. Portable meat aging device of claim 4 wherein display function shows the humidity level inside the box.

6. Portable meat aging device of claim 1 further comprising a carbon filter net installed on the opening of the said external blower.

7. Portable meat aging device of claim 1 further comprising a wife transceiver module installed inside the powered control module to monitor humidistat on a computer device.

8. Portable meat aging device of claim 7 wherein the computer device is connected to the internet.

9. Portable meat aging device of claim 1 where the Power control module is coupled to a power chord that is electrically coupled to an external power source.

10. Portable meat aging device of claim 1 further comprising a viewing panel hingedly coupled with the front side of the box.

11. Portable meat aging device of claim 10 where the viewing panel is made up of a transparent material.

* * * * *